Dec. 6, 1938. B. F. DEAVER 2,139,577
ADJUSTABLE AUTOMATIC SELF RELEASING HITCH
Filed Oct. 17, 1938
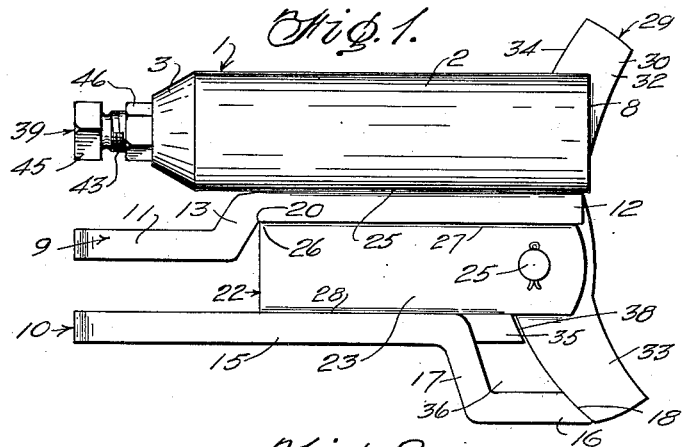
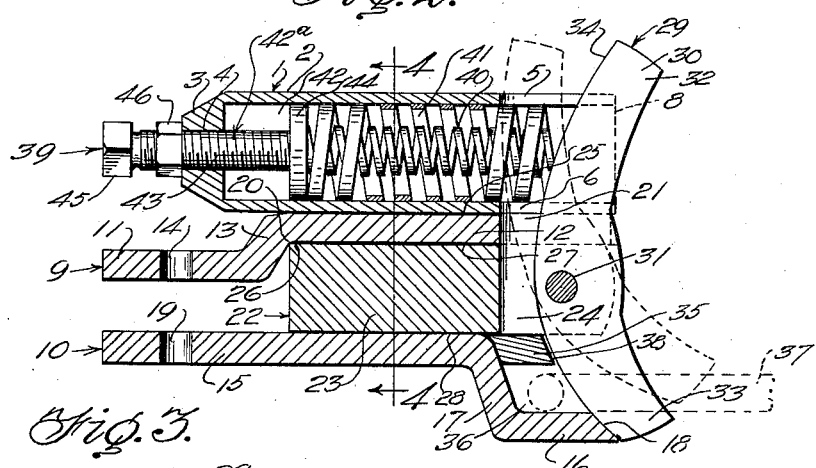
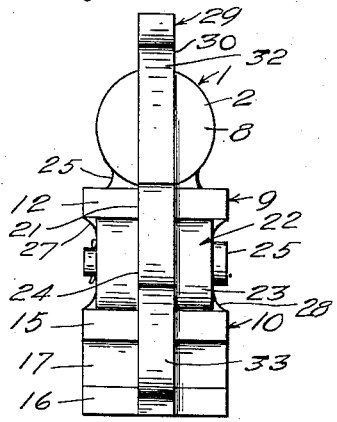 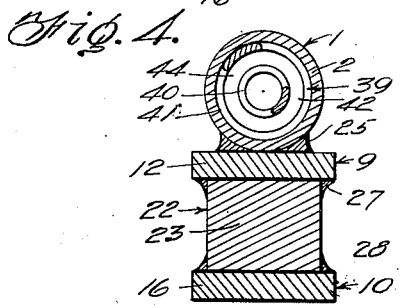
Inventor
BENJAMIN F. DEAVER,
By Kimmel & Crowell
Attorneys Patented Dec. 6, 1938

2,139,577

UNITED STATES PATENT OFFICE 2,139,577

ADJUSTABLE AUTOMATIC SELF-RELEASING HITCH

Benjamin F. Deaver, Breckenridge, Tex.

Application October 17, 1938, Serial No. 235,515

8 Claims. (Cl. 280—33.16)

This invention relates to an adjustable automatic self-releasing hitch designed primarily for use with a tractor, but it is to be understood that a hitch, in accordance with this invention may be employed in any connection for which it may be found applicable.

The invention aims to provide, in a manner as hereinafter set forth a hitch for automatically releasing a load being pulled by power when the load strikes an obstruction.

The invention further aims to provide, in a manner as hereinafter set forth, a hitch including adjustable means to regulate it for the load desired to be pulled.

The invention further aims to provide, in a manner as hereinafter set forth, a hitch including an eccentrically pivoted, spring controlled, automatically releasable lever for latching the load to be pulled with the body of the hitch.

Further aims of the invention are to provide, in a manner as hereinafter set forth, a hitch for the purpose referred to which is simple in its construction, strong, durable, compact, having an automatic releasing action to disconnect the load therefrom when occasion requires, adjustable, thoroughly efficient in its use, readily installed with respect to pulling or traction means, and comparatively inexpensive to manufacture.

Embodying the aims aforesaid and to others which may directly or indirectly hereinafter appear, the invention consists of the novel construction, combination and arrangement of parts to be more specifically referred to and as illustrated in the accompanying drawing, wherein is shown an embodiment of the invention, but it is to be understood, that changes, variations and modifications may be resorted to which fall within the scope of the invention as claimed.

In the drawing:

Figure 1 is a side elevation of the hitch,

Figure 2 is a longitudinal sectional view of the hitch and showing in full and dotted lines respectively, the active and inactive positions of the latching lever, Figure 3 is an elevation looking towards the rear end of the hitch, and Figure 4 is a section on line 4—4 Figure 2.

The hitch includes a housing 1 formed of a horizontally disposed cylindrical portion 2 of any suitable diameter and length open at its rear end, and a peripherally tapered forward end portion 3 provided with an axially disposed threaded opening 4. The rear end terminal part of the portion 2, lengthwise thereof is formed with a pair of diametrically opposed aligned slots 5, 6 opening at the rear end surface 8 of portion 2. The portion 3 has its body of greater thickness than the thickness of the body of portion 2.

The hitch includes an upper and a lower coupling strap 9, 10 respectively which are disposed horizontally and arranged in superposed aligned spaced relation. Each strap is of rectangular contour in transverse cross section and of greater width and length than the diameter and length of housing 1. The straps are of like width and substantially of the same length. The strap 9 consists of a lower front portion 11, an upper rear portion 12 and an upstanding rearwardly inclined intermediate portion 13 merging at its lower end into the rear end of portion 11, and at the upper end into the forward end of the portion 12. The portion 13 is of less length than the length of the portions 11, 12. The portion 12 is of greater length than the portion 11. The latter, intermediate its ends and on its lengthwise median is formed with a vertical opening 14. The strap 10 consists of a front portion 15, a rear portion 16 and a depending rearwardly inclined intermediate portion 17 merging at its upper end into the rear end of the portion 15 and at its lower end into the forward end of the portion 16. The portion 15 is of materially greater length than the portions 16, 17. The portion 16 is of slightly greater length than portion 17 and has a beveled rear end surface 18. The portion 15, intermediate its ends and on its lengthwise median is formed with a vertical opening 19. The length of portion 15 of strap 10 will equal the combined length of portions 11, 13 and the major part of the length of portion 12 of strap 9. The point of mergence between the portions 11, 13 of the strap 9 provides the lower face of the latter with an abutment, as indicated at 20. The rear part of the portion 12 of strap 9 on its lengthwise median is formed with a slot 21 opening at its rear end.

When the straps 9, 10 are disposed in superposed spaced relation, the lengthwise edges thereof align, the openings 14, 19 align, the portion 15 of strap 10 aligns with the portions 11, 13 and the major part of portion 12 of strap 9, and the portion 16 of strap 10 aligns with the rear part of the portion 12 of strap 9.

The hitch includes a combined strap spacer and pivot support element 22 consisting of rectangular block 23 corresponding in length to the length of end portion 12 of the strap 9 and having its rear end terminal part formed, on its lengthwise median with a vertically disposed slot 24 opening at the rear end surface of the block. Secured to the block 23, and extending transversely of the slot 24 is a pivot 25 arranged forwardly of the open end of said slot. The block 23 is of less width, but of greater thickness than the width and thickness of the straps 9, 10.

The portion 12 of strap 9 is of less length than the cylindrical portion 2 of housing 1 and it is positioned against the major part of the length of the lower face of such portion, in a manner whereby the rear end of portion 12 will be flush with the rear end of cylindrical portion 2, and with the longitudinal median of the latter aligning with the longitudinal median of portion 12 of strap 9. The cylindrical portion 2 of the housing has its lower surface welded to the upper surface of strap portion 12, as at 25. When the said portions 2 and 12 are welded together the slots 5, 6 and 21 align, and with the slot 6 registering with the slot 21.

The block 23 is arranged between and seated against the lower face of strap portion 12 and against the upper face of strap portion 15. The block 23 is arranged relatively to the straps 9, 10 in a manner whereby the upper forward corner 26 of the block bears against the abutment 20. When so arranged, the block 23 extends rearwardly from strap portion 15, overhangs strap portions 16, 17, and has its longitudinal median aligning with the longitudinal medians of the straps 9, 10. The block 23 is welded, as at 27, 28 to the lower and upper faces respectively of the straps 9, 10.

The hitch includes a latching member 29 in the form of an upstanding lever 30, of arcuate contour formed, between its transverse median and its lower end with an opening 31. The lever 30 is of a length to extend from the strap portion 16 to above the cylindrical portion 2. The lever 30 is arranged within the slots or furcations 5, 6 and 21, and is mounted on pivot 25. The latter extends through the opening 31 and owing to the position of the opening with respect to the length of the lever, the latter is eccentrically mounted. The lever 30 is of the double arm type, that is to say it is formed with an upper arm 32 and a lower arm 33. The arm 32 is of greater length than the arm 33. The forward lengthwise edge 34 of lever 3 is upon the segment of a circle.

The hitch includes a horizontally disposed stop 35 which coacts with the strap portion 16 to provide a recess 36 for the forward end of a link 37 attached with the load. The link 37 (shown in dotted lines Figure 2) in connection with the lever couples the load with the hitch. The stop 35 arrests the upper passage of the link 37 from the recess 36. The stop 35 is secured to the upper end of strap position 17, extends rearwardly from the latter, overhangs and is of less length than strap portion 16, and is of less width than strap portion 17. The rear end surface 38 of the stop 35 is beveled and permanently spaced from edge 34 of lever 31. The strap portion 16 constitutes a keeper and coacts with arm 33 of the lever 31 for retaining the link 37 in the recess 36, when lever 31 is in its active position.

The hitch includes an adjustable resilient spring pressure exerting controlling structure 39 for the lever 31, and which acts to normally and releasably hold the lever 31 in active or latching position, and such position is the abutting of the lower portion of the edge 34 of lever 31 with the rear end surface 18 of strap portion 16. The structure 39 is mounted in and extends forwardly from housing 1, and it includes a plurality of coaxially arranged coiled contractible and extendible springs. The outer spring preferably will be of greater strength than the spring or springs which it encompasses. As shown, by way of example the structure 39 is formed with an inner and an outer spring 40, 41 respectively. The spring 41 is of greater strength and of materially greater diameter than the spring 40. The springs are arranged in the chamber 42 provided by the cylindrical portion 2 of housing 1, and permanently bear at their rear ends against the forward lengthwise edge of the upper arm 32 of lever 30, and normally act to releasably maintain the arm 35 of lever 30 against the rear end of strap portion 16. The diameter of spring 41 corresponds to the inner diameter of housing portion 2. Threadably engaging with the wall of opening 4 is an adjustable tensioning element 42ª, and which consists of a peripherally threaded rod 43 passing through and engaging with the wall of opening 4. The rod 43 has secured to its inner end a compressor 44 of disc-like form permanently arranged in chamber 42, bearing against the forward ends of springs 40, 41, of a diameter corresponding to the inner diameter of the housing portion 2, and has a close sliding fit with the inner face of the said housing portion 2. The forward end of rod 43 is formed with a polygonal shaped head 45 for receiving a suitable tool, not shown, for facilitating the adjusting of element 42. The rod 43 carries a lock nut 46 which coacts with housing portion 3 for releasably securing element 42 in its adjusted position.

The straps 9, 10 are adapted to be connected to a pulling means, by way of example a tractor by the passage of a bolt, pin or coupler, not shown, passing through the openings 14, 19 and suitably connected with the pulling means or to the body of the tractor. The hitch may be of any size desired.

From the construction aforesaid it is obvious that the hitch functions to automatically release a load being pulled by power when the load strikes a solid obstruction, or to better illustrate, should the plow come in contact with a rock, stump or solid object, the lever 30 overcoming the tension of the springs automatically releases the plow being pulled.

An exceedingly heavy load may be pulled by putting strong springs in the housing portion 2, or a small load may be pulled by adjusting the springs in housing portion 2. With the aid of the adjustable resilient controlling structure, any size load may be handled, from small to extra large by the hitch.

What I claim is:

1. In a hitch, a horizontally disposed housing having a bifurcated rear end terminal portion, an upper horizontally disposed coupling strap secured to and lengthwise of the bottom of the housing and having a bifurcated rear end terminal portion, a lower horizontally disposed coupling strap having an offset rear end portion, a combined strap spacer and pivot supporting element arranged between and secured to said straps and having a bifurcated rear end terminal portion, a pivot extending across the furcation in said element, a normally active automatically releasable upstanding lever arranged within the furcations of the housing, upper strap and element, mounted on said pivot and depending from said element, said lever having its lower portion coacting with the offset portion of the lower strap for latching a load to the hitch, and an adjustable resilient spring pressure exerting controlling structure arranged within and extending forwardly from the housing and permanently bearing against the upper portion of said lever for normally maintaining the latter active until the pull on the load overcomes the pressure applying action of said structure.

2. In a hitch, a horizontally disposed housing having a bifurcated rear end terminal portion, an upper horizontally disposed coupling strap secured to and lengthwise of the bottom of the housing and having a bifurcated rear end terminal portion, a lower horizontally disposed coupling strap having an offset rear end portion, a combined strap spacer and pivot supporting element arranged between and secured to said straps and having a bifurcated rear end terminal portion, a pivot extending across the furcations in said element, a normally active automatically releasable upstanding lever arranged within the furcations of the housing, upper strap and element and depending from the latter, said lever having its lower portion coacting with the offset portion of the lower strap for latching a load to the hitch, and an adjustable resilient spring pressure exerting controlling structure arranged within and extending forwardly from the housing and permanently bearing against the upper portion of said lever for normally maintaining the latter active until the pull on the load overcomes the pressure applying action of said structure, said lever being mounted eccentrically thereof on said pivot.

3. In a hitch, a horizontally disposed housing having a bifurcated rear end terminal portion, an upper horizontally disposed coupling strap secured to and lengthwise of the bottom of the housing and having a bifurcated rear end terminal portion, a lower horizontally disposed coupling strap having an offset rear end portion, a combined strap spacer and pivot supporting element arranged between and secured to said straps and having a bifurcated rear end terminal portion, a pivot extending across the furcation in said element, a normally active automaticaly releasable upstanding lever arranged within the furcations of the housing, upper strap and element and depending from the latter, said lever having its lower portion co-acting with the offset portion of the lower strap for latching a load to the hitch, an adjustable resilient spring pressure exerting controlling structure arranged within and extending forwardly from the housing and permanently bearing against the upper portion of said lever for normally maintaining the latter active until the pull on the load overcomes the pressure applying action of said structure, and a rearwardly extending stop carried by said lower strap and overhanging in spaced relation said offset rear end portion to provide a recess forwardly of the lower portion of the lever, and said lever, intermediate its ends being mounted on said pivot.

4. In a hitch, a horizontally disposed housing having a bifurcated rear end terminal portion, an upper horizontally disposed coupling strap secured to and lengthwise of the bottom of the housing and having a bifurcated rear end terminal portion, a lower horizontally disposed coupling strap havng an offset rear end portion, a combined strap spacer and pivot supporting element arranged between and secured to said straps and having a bifurcated rear end terminal portion, a pivot extending across the furcation in said element, a normally active automatically releasable upstanding lever arranged within the furcations of the housing, upper strap and element and depending from the latter, said lever having its lower portion coacting with the offset portion of the lower strap for latching a load to the hitch, an adjustable resilient spring pressure exerting controlling structure arranged within and extending forwardly from the housing and permanently bearing against the upper portion of said lever for normally maintaining the latter active until the pull on the load overcomes the pressure applying action of said structure, and a rearwardly extending stop carried by said lower strap and overhanging in spaced relation said offset rear end portion to provide a recess forwardly of the lower portion of the lever, said lever being mounted eccentrically thereof on said pivot.

5. In a hitch a horizontally disposed structure formed lengthwise of its upper portion with a chamber open at its rear, said structure below said chamber being formed with a forwardly extending coupler means adapted to be connected to a pulling means, said structure being formed at its rear with superimposed furcations, an upstanding latching lever arranged within and extending above and depending from said furcations, pivot means extending across one of the furcations for pivotally supporting said lever, said structure being provided at its rear with an offset part providing a keeper below the bottom thereof for coacting with said lever for latching a load to the hitch, and an adjustable resilient spring pressure exerting controlling means arranged within and extending forwardly from said chamber and permanently bearing against said lever for normally maintaining the latter active until the pull on the load overcomes the pressure applied to the lever.

6. In a hitch a horizontally disposed structure formed lengthwise of its upper portion with a chamber open at its rear, said structure below said chamber being formed with a forwardly extending coupler means adapted to be connected to a pulling means, said structure being formed at its rear with superimposed furcations, an upstanding latching lever arranged within and extending above and depending from said furcations, pivot means extending across one of the furcations for pivotally supporting said lever, said structure being provided at its rear with an offset part providing a keeper below the bottom thereof for coacting with said lever for latching a load to the hitch, and an adjustable resilient spring pressure exerting controlling means arranged within and extending forwardly from said chamber and permanently bearing against said lever for normally maintaining the latter active until the pull on the load overcomes the pressure applied to the lever, said lever being mounted eccentrically thereof on said pivot means.

7. In a hitch a horizontally disposed structure formed lengthwise of its upper portion with a chamber open at its rear, said structure below said chamber being formed with a forwardly extending coupler means adapted to be connected to a pulling means, said structure being formed at its rear with superimposed furcations, an upstanding latching lever arranged within and extending above and depending from said furcations, pivot means extending across one of the furcations for pivotally supporting said lever, said structure being provided at its rear with an offset part providing a keeper below the bottom thereof for coacting with said lever for latching a load to the hitch, an adjustable resilient spring pressure exerting controlling means arranged within and extending forwardly from said chamber and permanently bearing against said lever for normally maintaining the latter active until the pull on the load overcomes the pressure applied to the lever, and said structure having a part positioned below the furcations providing a rearwardly extending stop overhanging in spaced relation the said other part to provide a recess forwardly of the lower portion of said lever.

8. In a hitch a horizontally disposed structure formed lengthwise of its upper portion with a chamber open at its rear, said structure below said chamber being formed with a forwardly extending coupler means adapted to be connected to a pulling means, said structure being formed at its rear with superimposed furcations, an upstanding latching lever arranged within and extending above and depending from said furcations, pivot means extending across one of the furcations for pivotally supporting said lever, said structure being provided at its rear with an offset part providing a keeper below the bottom thereof for coacting with said lever for latching a load to the hitch, an adjustable resilient spring pressure exerting controlling means arranged within and extending forwardly from said chamber and permanently bearing against said lever for normally maintaining the latter active until the pull on the load overcomes the pressure applied to the lever, and said structure having a part positioned below the furcations providing a rearwardly extending stop overhanging in spaced relation the said other part to provide a recess forwardly of the lower portion of said lever, said lever being mounted eccentrically thereof on said pivot means, the latter being arranged in the lowermost furcation.

BENJAMIN F. DEAVER.